(12) United States Patent
Saeda et al.

(10) Patent No.: US 10,911,627 B2
(45) Date of Patent: Feb. 2, 2021

(54) IMAGE FORMING APPARATUS AND IMAGE FORMING APPARATUS SYSTEM

(71) Applicant: SHARP KABUSHIKI KAISHA, Osaka (JP)

(72) Inventors: Masao Saeda, Osaka (JP); Yasuhiro Nakai, Osaka (JP); Kohji Katamoto, Osaka (JP); Kohichi Murakami, Osaka (JP); Yasutomo Hayano, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/707,656

(22) Filed: Dec. 9, 2019

(65) Prior Publication Data

US 2020/0195804 A1 Jun. 18, 2020

(30) Foreign Application Priority Data

Dec. 14, 2018 (JP) ................................. 2018-234573

(51) Int. Cl.
| | |
|---|---|
| *H04N 1/00* | (2006.01) |
| *H04N 1/34* | (2006.01) |
| *G06F 1/3234* | (2019.01) |
| *G06F 1/3231* | (2019.01) |

(52) U.S. Cl.
CPC ....... *H04N 1/00896* (2013.01); *G06F 1/3231* (2013.01); *G06F 1/3284* (2013.01); *H04N 1/344* (2013.01)

(58) Field of Classification Search
None
See application file for complete search history.

(56) References Cited

U.S. PATENT DOCUMENTS

| | | | | |
|---|---|---|---|---|
| 5,907,319 A | * | 5/1999 | Hashimoto | G03G 15/502 345/173 |
| 6,067,168 A | * | 5/2000 | Nishiyama | H04N 1/00127 358/1.14 |
| 6,081,342 A | * | 6/2000 | Nakai | H04N 1/32358 358/1.15 |
| 10,162,587 B2 | * | 12/2018 | Suzuki | G06F 3/1229 |
| 2006/0143011 A1 | * | 6/2006 | Kawamura | G09B 21/006 704/260 |
| 2007/0002354 A1 | * | 1/2007 | Iwasaki | G03G 21/02 358/1.13 |
| 2007/0059014 A1 | * | 3/2007 | Oka | G03G 15/5004 399/79 |
| 2007/0109584 A1 | * | 5/2007 | Motohashi | H04N 1/32545 358/1.13 |
| 2008/0147900 A1 | * | 6/2008 | Iizuka | G03G 15/5075 710/8 |

(Continued)

FOREIGN PATENT DOCUMENTS

| | | |
|---|---|---|
| JP | 2015-005905 A | 1/2015 |
| JP | 2019128633 A * | 8/2019 |

*Primary Examiner* — Ted W Barnes
(74) *Attorney, Agent, or Firm* — ScienBiziP, P.C.

(57) ABSTRACT

An image forming apparatus system includes an image forming apparatus and a coin device that receives a usage fee to use the image forming apparatus. The image forming apparatus may execute the auto-clear based on a detection of a detection sensor that detects a user. The detection sensor includes only a first detection sensor disposed in a range of an area of an operator.

6 Claims, 5 Drawing Sheets

(56) References Cited

U.S. PATENT DOCUMENTS

| | | | |
|---|---|---|---|
| 2013/0201516 A1* | 8/2013 | Ito | H04N 1/00204 358/1.14 |
| 2014/0153013 A1* | 6/2014 | Imamura | G03G 15/5004 358/1.12 |
| 2014/0376941 A1* | 12/2014 | Okuzono | G03G 15/5091 399/75 |
| 2015/0029539 A1* | 1/2015 | Kim | H04N 1/00352 358/1.15 |
| 2015/0264206 A1* | 9/2015 | Maeda | H04N 1/00506 358/1.13 |
| 2016/0042496 A1* | 2/2016 | Ichimi | G06F 3/04883 345/671 |
| 2016/0124496 A1* | 5/2016 | Horishita | G06F 1/3284 713/323 |
| 2016/0219174 A1* | 7/2016 | Umeda | H04N 1/00891 |
| 2017/0090553 A1* | 3/2017 | Hiraike | G06F 1/3228 |
| 2018/0129264 A1* | 5/2018 | Goda | G03G 15/5016 |
| 2018/0176404 A1* | 6/2018 | Onishi | G06F 1/3231 |
| 2018/0234570 A1* | 8/2018 | Yamaguchi | G06F 3/1221 |
| 2018/0246687 A1* | 8/2018 | Nishio | G06F 1/3215 |
| 2019/0004751 A1* | 1/2019 | Ikeda | H04N 21/485 |
| 2020/0036845 A1* | 1/2020 | Kondo | H04N 1/00411 |

\* cited by examiner

IMAGE FORMING APPARATUS AND IMAGE FORMING APPARATUS SYSTEM

BACKGROUND OF THE INVENTION

Field of the Invention

The present invention relates to an image forming apparatus including a detection sensor that detects a user and an image forming apparatus system.

Description of the Background Art

There are conventionally known image forming apparatuses, such as copiers, fax devices, printers, and multifunction peripherals, including a detection sensor that detects a user to operate in accordance with a detection result of the detection sensor.

For example, in order to achieve energy saving, an image forming apparatus including a detection sensor may be configured to have a power-saving mode (energy-saving mode) for shifting from a high power consumption state to a low power consumption state in which the supplied energy is smaller than that in the high power consumption state to shift to the power-saving mode when a predetermined condition is satisfied (for example, when the standby state of the image forming apparatus continues for a predetermined time period and/or when it is detected that there is no user nearby in accordance with a detection result of the detection sensor). Furthermore, the image forming apparatus including the detection sensor may be configured to be reset to the high power consumption state when it is detected that a user is present nearby in accordance with a detection result of the detection sensor while in the power-saving mode (for example, Japanese Unexamined Patent Application Publication No. 2015-5905).

Unfortunately, the following problem occurs in an image forming apparatus including a detection sensor.

There are various types of detection sensors, and the costs are different depending on the function of a sensor. As the detection sensor used in an image forming apparatus does not particularly need to be a multifunctional sensor, it is preferable to use a low-cost single-function detection sensor (e.g., an infrared sensor or an ultrasonic sensor) capable of detecting only the detection of a user within the detection range.

In a case where such a single-function detection sensor is used, however, it is difficult to detect the entire movement range of a user in front of the image forming apparatus with a single detection sensor. Specifically, as illustrated in FIG. 5, multiple (at least about five) detection sensors (in the figure, the installation positions of the detection sensors are indicated by a black square frame) may be installed in order to detect the entire movement range of a user in front of the image forming apparatus. For this reason, there is a conventional problem of an increase in the costs of the image forming apparatus due to the installation of multiple detection sensors.

The present invention has been made in consideration of the above-described problem and has an object to provide an image forming apparatus and an image forming apparatus system with which it is possible to execute the auto-clear in an optimum manner while the number of detection sensors used is reduced.

SUMMARY OF THE INVENTION

In order to solve the above-described problem, an image forming apparatus according to a first aspect of the present invention is an image forming apparatus including a detection sensor and an operator, the image forming apparatus executes auto-clear after a predetermined auto-clear time has elapsed when detection of a user is not detected by the detection sensor halfway through a series of operations of the image forming apparatus, and the detection sensor includes only a first detection sensor disposed within a range of an area of the operator in the image forming apparatus.

Furthermore, in order to solve the above problem, an image forming apparatus according to a second aspect of the present invention is an image forming apparatus including a detection sensor and a sheet discharger, the image forming apparatus executes auto-clear after a predetermined auto-clear time has elapsed when detection of a user is not detected by the detection sensor halfway through a series of operations of the image forming apparatus, and the detection sensor includes only a first detection sensor disposed within a range of an area of the sheet discharger in the image forming apparatus.

With the above configuration, as the detection sensor installed in the image forming apparatus is only the first detection sensor disposed within the range of the area of the operator or the sheet discharger, no detection sensor may be provided in a unimportant area outside the range of the normal operation. This makes it possible to reduce the number of detection sensors used and reduce the costs of the image forming apparatus.

As the first detection sensor may detect the detection of a user in the range of the normal operation of the image forming apparatus, it is possible to detect a user who has discontinued the operation and has left in the middle of the operation. Thus, the image forming apparatus including the first detection sensor may perform the auto-clear in an optimal manner.

In the above-described image forming apparatus, the first detection sensor may be configured to be a single-function detection sensor (e.g., an infrared sensor or an ultrasonic sensor) capable of detecting only the detection of a user in accordance with a temperature characteristic or an action within a detection range of the first detection sensor.

With the above configuration, the use of the low-cost single-function detection sensor may reduce the costs of the image forming apparatus.

The above-described image forming apparatus may be configured to set a first auto-clear time as a time before the auto-clear when the first detection sensor does not detect the detection of the user and a user's operation has been completed at a corresponding time and set a second auto-clear time that is longer than the first auto-clear time as the time before the auto-clear when the first detection sensor does not detect the detection of the user and the user's operation is halfway at a corresponding time.

With the above configuration, as the auto-clear time may be changed in accordance with the details of the final operation when it is detected that the user has left, the auto-clear may be executed more appropriately.

Furthermore, in order to solve the above problem, an image forming apparatus system according to a third aspect of the present invention includes an image forming apparatus, and a payment device disposed adjacent to the image forming apparatus to receive a usage fee to use the image forming apparatus, the image forming apparatus includes a first detection sensor, the payment device includes a second detection sensor disposed within a range of an area of the payment device, and the image forming apparatus executes auto-clear after a predetermined auto-clear time has elapsed when both the first detection sensor and the second detection sensor do not detect detection of a user.

With the above configuration, it is possible to handle the case where the range of the area in front of the payment device is included in the range of the normal operation of the image forming apparatus.

The image forming apparatus and the image forming apparatus system according to the present invention include no detection sensor in a unimportant area outside the range of the normal operation of the image forming apparatus to produce an advantageous effect such that the detection of a user may be detected in the range of the normal operation while the costs of the image forming apparatus are reduced so that the auto-clear may be executed in an optimal manner.

DESCRIPTION OF THE PREFERRED EMBODIMENTS

First Embodiment

With reference to the drawings, embodiments of the present invention are described below in detail.

Figure 1:
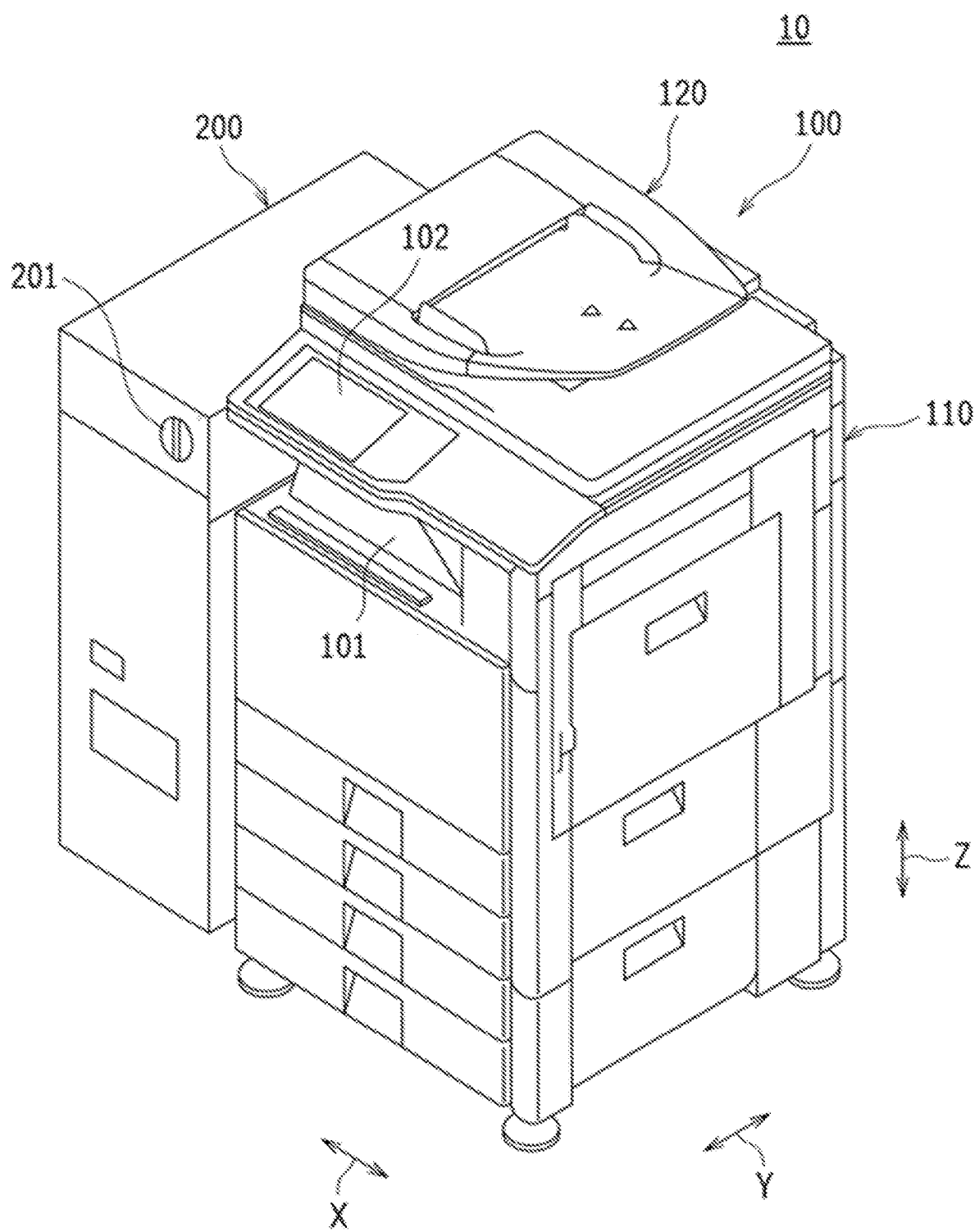
FIG. 1 is a perspective view illustrating a schematic configuration of an image forming apparatus system according to a first embodiment of the present invention.

FIG. 1 is a perspective view illustrating a schematic configuration of an image forming apparatus system 10 according to a first embodiment of the present invention. In FIG. 1, a reference mark X represents a horizontal direction, a reference mark Y represents a depth direction, and a reference mark Z represents a vertical direction.

It is assumed that the image forming apparatus system 10 is installed in a store such as a convenience store and is used if a customer, who is a user, pays a fee (usage fee). As illustrated in FIG. 1, the image forming apparatus system 10 includes an image forming apparatus 100 and a coin device 200 that is electrically connected to the image forming apparatus 100 to transmit and receive signals. In the following description, the coin device 200 is described as an example of a payment device used in the image forming apparatus system 10. The payment device used in the image forming apparatus system 10 may include not only a coin device but also other devices such as a bill validator kit, an electronic money reader, a credit card reader, a QR code (registered trademark) reader, or a Web money reader.

Here, the image forming apparatus 100 is a multifunction peripheral including an image forming apparatus main body 110 and a document reading device 120. The image forming apparatus 100 has functions such as copy, print, fax, and scan. The image forming apparatus 100 further includes a sheet discharger 101 and an operator 102.

The sheet discharger 101 is an area for discharging a recording sheet having an image formed thereon by the image forming apparatus main body 110. The sheet discharger 101 is provided as a space between the upper surface of the image forming apparatus main body 110 and the document reading device 120. The front side of the sheet discharger 101 is opened so that the user is able to easily take out the discharged recording sheet.

The operator 102 is used by a user to operate the image forming apparatus 100 and is disposed on the front side of the image forming apparatus 100. The operator 102 is, for example, a touch panel display. The operator 102 displays an image regarding an operation and also allows an input due to the touch with the screen of the operator 102.

The coin device 200 receives a usage fee for the user to use the image forming apparatus 100. The coin device 200 is disposed adjacent to the image forming apparatus 100. The coin device 200 includes a coin insertion slot 201 through which the user inserts a coin as a usage fee for the image forming apparatus 100.

Figure 2:
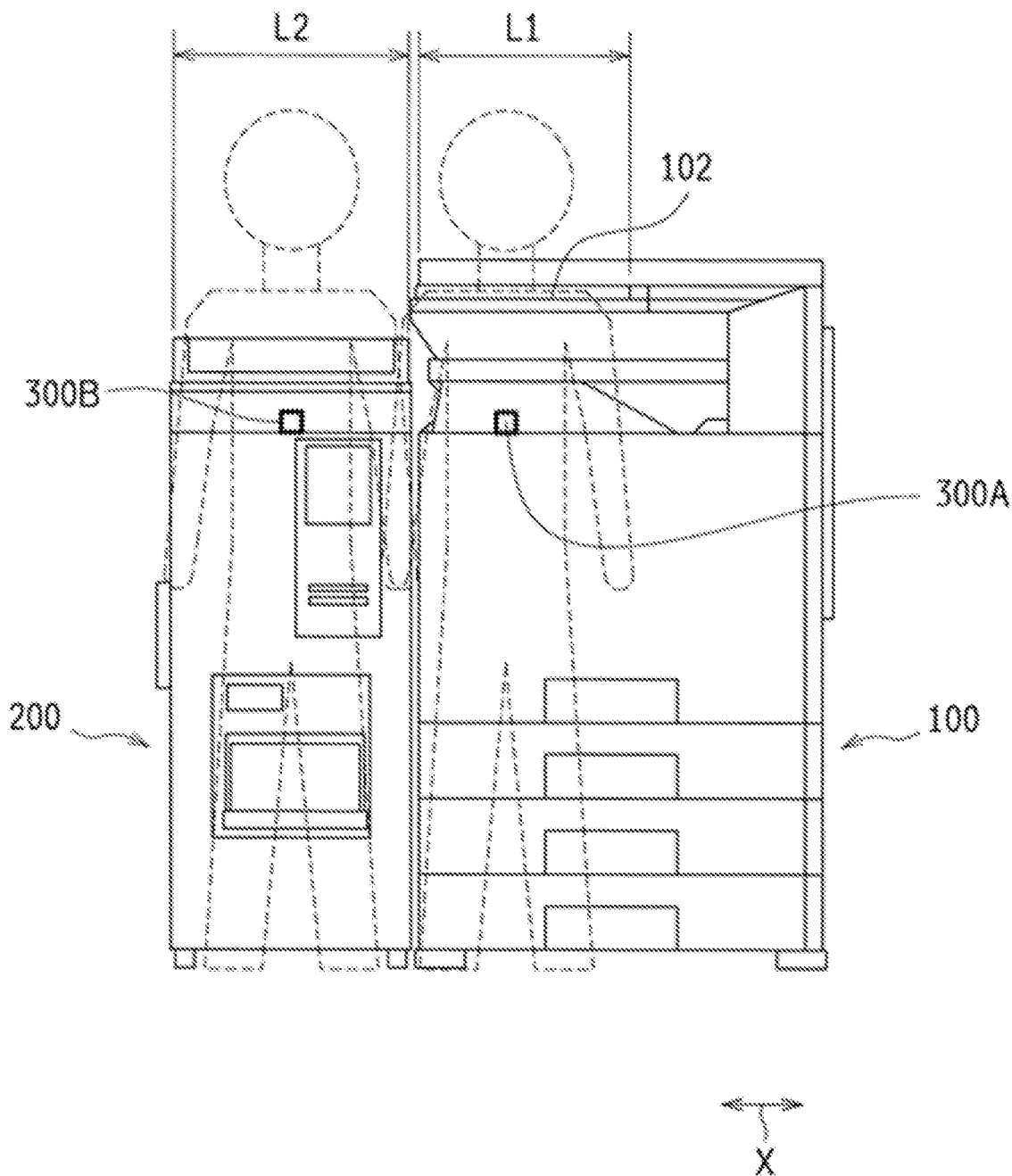
FIG. 2 is a front view illustrating installation positions of detection sensors in the image forming apparatus system according to the first embodiment.

The image forming apparatus system 10 includes a first detection sensor 300A and a second detection sensor 300B on the front side thereof. FIG. 2 is a front view of the image forming apparatus system 10, illustrating the installation positions of the first detection sensor 300A and the second detection sensor 300B. In the following description, the first detection sensor 300A and the second detection sensor 300B may be collectively referred to as a detection sensor 300.

The detection sensor 300 is a sensor that detects the detection of a user within a predetermined detection range. In the image forming apparatus system 10, a low-cost single-function detection sensor is used as the detection sensor 300. A single-function detection sensor is a sensor that is capable of detecting only the detection of a user based on the temperature characteristics or an action within the detection range of the detection sensor. For example, the single-function detection sensor corresponds to an infrared sensor or an ultrasonic sensor.

The first detection sensor 300A is provided such that the detection area thereof is the front side of the operator 102 of the image forming apparatus 100. More specifically, the first detection sensor 300A is provided within the range of an area L1 of the operator 102 in the horizontal direction X. This allows the first detection sensor 300A to detect the detection of the user when the user is standing in front of the operator 102 and is operating the image forming apparatus 100.

The second detection sensor 300B is provided such that the detection area thereof is the front side of the coin device 200. More specifically, the second detection sensor 300B is provided within the range of an area L2 of the coin device 200 in the horizontal direction X. This allows the second detection sensor 300B to detect the detection of the user when the user is standing in front of the coin device 200 and is paying the usage fee.

Figure 3:
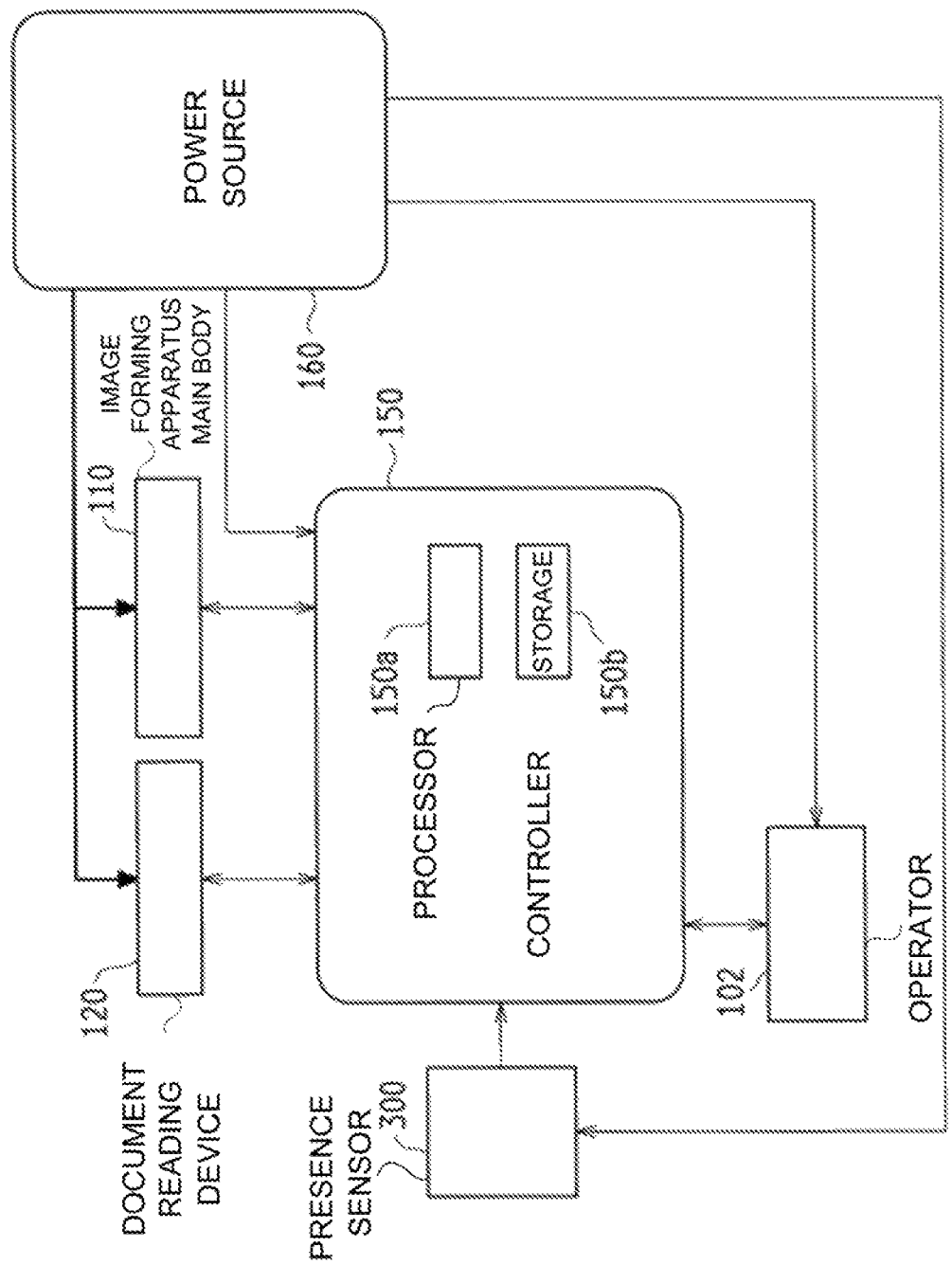
FIG. 3 is a block diagram illustrating a control system of the image forming apparatus system according to the first embodiment.

FIG. 3 is a block diagram illustrating a control system of the image forming apparatus system 10. As illustrated in FIG. 3, the image forming apparatus 100 includes a controller 150 that performs the overall control on the image forming apparatus 100. The controller 150 includes a processor 150a including a microcomputer such as a central processing unit (CPU) and a storage 150b including a storage device such as a read only memory (ROM), a random access memory (RAM), or a data-rewritable non-volatile memory.

The controller 150 controls the operation for each function, such as copy, print, fax, or scan, in the image forming apparatus 100. Further, the controller 150 receives a signal from the coin device 200 and controls the coin device 200. Specifically, when the user inserts a coin through the coin insertion slot 201 of the coin device 200, the signal indicating the insertion is transmitted to the controller 150 of the image forming apparatus 100. A detection signal from the detection sensor 300 is also transmitted to the controller 150 so that the controller 150 determines the detection or absence of the user based on the detection signal.

The image forming apparatus 100 further includes a power source 160. A control line, indicated by a thin line, of the power source 160 is electrically connected to the controller 150, the detection sensor 300, the operator 102, and the like, and a power line, indicated by a thick line, of the power source 160 is electrically connected to the image forming apparatus main body 110 and the document reading device 120.

The controller 150 has a power-saving mode for changing the image forming apparatus 100 from a high power consumption state to a low power consumption state in which the supplied energy is smaller than that in the high power consumption state. The low power consumption state in the power-saving mode includes a state in which no power is supplied from the power source 160 to the image forming apparatus main body 110 and the document reading device 120. The image forming apparatus 100 may control the power source 160 in accordance with an action (e.g., the touch with the operation screen) of the user to supply the electric power to a device for a start-up.

In this example, the controller 150 is configured to set the power-saving mode when a predetermined condition is satisfied (for example, when the standby state of the image forming apparatus 100 continues for a predetermined time period and/or when it is detected that no user is present in accordance with a detection result of the detection sensor 300). Furthermore, while in the power-saving mode, the controller 150 is configured to reset the high power consumption state from the low power consumption state in the power-saving mode when it is detected that a user is present in accordance with a detection result of the detection sensor 300. In the power-saving mode, for example, the state is obtained such that the saved power is supplied to a fixing device of the image forming apparatus main body 110 so that the fixing temperature is a predetermined power-saving temperature (e.g., 150° C.) lower than a specified temperature (e.g., 170° C.) during an image forming operation and the controller 150 has started up.

The controller 150 also controls the execution of what is called auto-clear, that is, when the user moves away from the image forming apparatus 100 while the user inputs the operation of the image forming apparatus 100 through the operator 102, the details of the operation being input are canceled and the display on the operator 102 is reset to the portal screen, which is the default display.

When the controller 150 receives the signal indicating the absence of a user from the detection sensor 300 halfway through a series of operations having a plurality of steps, the controller 150 transmits an instruction to cancel the operation that has been input halfway to the operator 102 after a predetermined auto-clear time has elapsed. Further, the controller 150 transmits an instruction to display the portal screen to the operator 102. Here, the series of operations are, for example, operations for a copy process, a fax process, or a print process, and the process is completed by operations at multiple steps. A setting is specified corresponding to each of the steps in the series of operations. The setting is specified in accordance with the display screen on the operator 102.

A predetermined time before the auto-clear is executed is previously set in accordance with the setting, and the data is previously stored in the ROM of the storage 150b. The controller 150 receives, from the operator 102, the signal regarding the setting for the operation currently input by the user, refers to a table stored in the storage 150b, and determines the time before the auto-clear.

The image forming apparatus system 10 according to the first embodiment may limit the area where the detection sensor 300 is installed, reduce the number of the detection sensors 300 to be used, and execute the auto-clear in an optimal manner. This point is described in detail below.

As described above, the image forming apparatus system 10 includes the first detection sensor 300A and the second detection sensor 300B. Primarily, the first detection sensor 300A is provided to execute the auto-clear in the image forming apparatus 100 as appropriate. When the controller 150 receives the signal indicating the absence of a user from the detection sensor 300 halfway through the series of operations of the image forming apparatus 100, the controller 150 executes the auto-clear after a predetermined auto-clear time has elapsed. That is, when the user has discontinued the operation and has left in the middle of the operation, the detection sensor 300 detects that the user has left and promptly executes the auto-clear.

Here, with regard to the user who has discontinued an operation and has left, it is assumed that the user performs an operation until just before leaving and, during the operation, is standing in front of the operator 102. Therefore, to execute the auto-clear, if the detection sensor 300 that detects the absence of the user is limited to the first detection sensor 300A, the detection range of the detection sensor that detects whether the user has left is limited to the range of the normal operation of the image forming apparatus 100.

Even if there is a user outside the detection range of the first detection sensor 300A, there is a high possibility that he is not a user of the image forming apparatus 100, and therefore the area outside the detection range of the first detection sensor 300A is an unimportant area for the auto-clear. Even though the unimportant area is detected by the detection sensor, there is no relevance with the operating status and it is expected that the detection is useless. In the image forming apparatus system 10 installed in a convenience store, etc., other devices (e.g., automated teller machine (ATM) or multimedia kiosk (MMK)) are often provided adjacent to the image forming apparatus 100. If a detection sensor also detects an unimportant area outside the range of the normal operation, there is a possibility that the user of the adjacent device is mistakenly detected as a user of the image forming apparatus 100 and a problem arises in that it is difficult to properly shift to the auto-clear or the power-saving mode.

In the image forming apparatus 100 according to the first embodiment, the installed detection sensor is only the first detection sensor 300A disposed within the range of the area L1 of the operator 102, and no detection sensor is provided in the unimportant area outside the range of the normal operation. Thus, it is possible to reduce the number of detection sensors to be used and reduce the costs of the image forming apparatus 100. As the first detection sensor 300A is able to detect the detection of the user in the range of the normal operation of the image forming apparatus 100, it is also possible to detect the user who has discontinued the operation halfway and has left. Thus, the image forming apparatus 100 including the first detection sensor 300A may execute the auto-clear in an optimum manner.

Although the detection sensor installed in the image forming apparatus 100 is only the first detection sensor 300A, the second detection sensor 300B is also installed in the coin device 200 in the image forming apparatus system 10. Primarily, the second detection sensor 300B is provided to control the image forming apparatus 100 to reset the high power consumption state from the low power consumption state (the power-saving mode). It is preferable that, when the second detection sensor 300B detects a user while the image forming apparatus 100 is in the power-saving mode, the image forming apparatus 100 is promptly reset from the power-saving mode in accordance with the detection. The resetting of the image forming apparatus 100 from the power-saving mode may be executed in accordance with the detection by the first detection sensor 300A.

For the auto-clear of the image forming apparatus 100, a detection result of the second detection sensor 300B may or may not be used. As described above, the auto-clear of the image forming apparatus 100 may be executed in accordance with the detection of a user who has discontinued the operation and has left. It is preferable that a detection result of the second detection sensor 300B is not used for the auto-clear if it is not assumed that the user stands in front of the coin device 200 and operates the image forming apparatus 100. Conversely, a detection result of the second detection sensor 300B may be used for the auto-clear if it is assumed that the user operates the image forming apparatus 100 without sufficiently moving to the front of the operator 102 after paying with the coin device 200.

It is appropriately determined whether a detection result of the second detection sensor 300B is used for the auto-clear in accordance with, for example, the distance between the first detection sensor 300A and the second detection sensor 300B or the size of the detection areas of the first detection sensor 300A and the second detection sensor 300B. In a case where a detection result of the second detection sensor 300B is used for the auto-clear, it is determined that the user has moved from the front of the image forming apparatus 100 when both the first detection sensor 300A and the second detection sensor 300B do not detect the detection of the user any longer.

Second Embodiment

In the above-described first embodiment, the range of the normal operation of the image forming apparatus 100 is assumed to be the area L1 of the operator 102 and the first detection sensor 300A installed in the image forming apparatus 100 is disposed within the range of the area L1. However, the present invention is not limited thereto, and the range of the normal operation of the image forming apparatus 100 may be assumed to be different from the above-described range.

Figure 4:
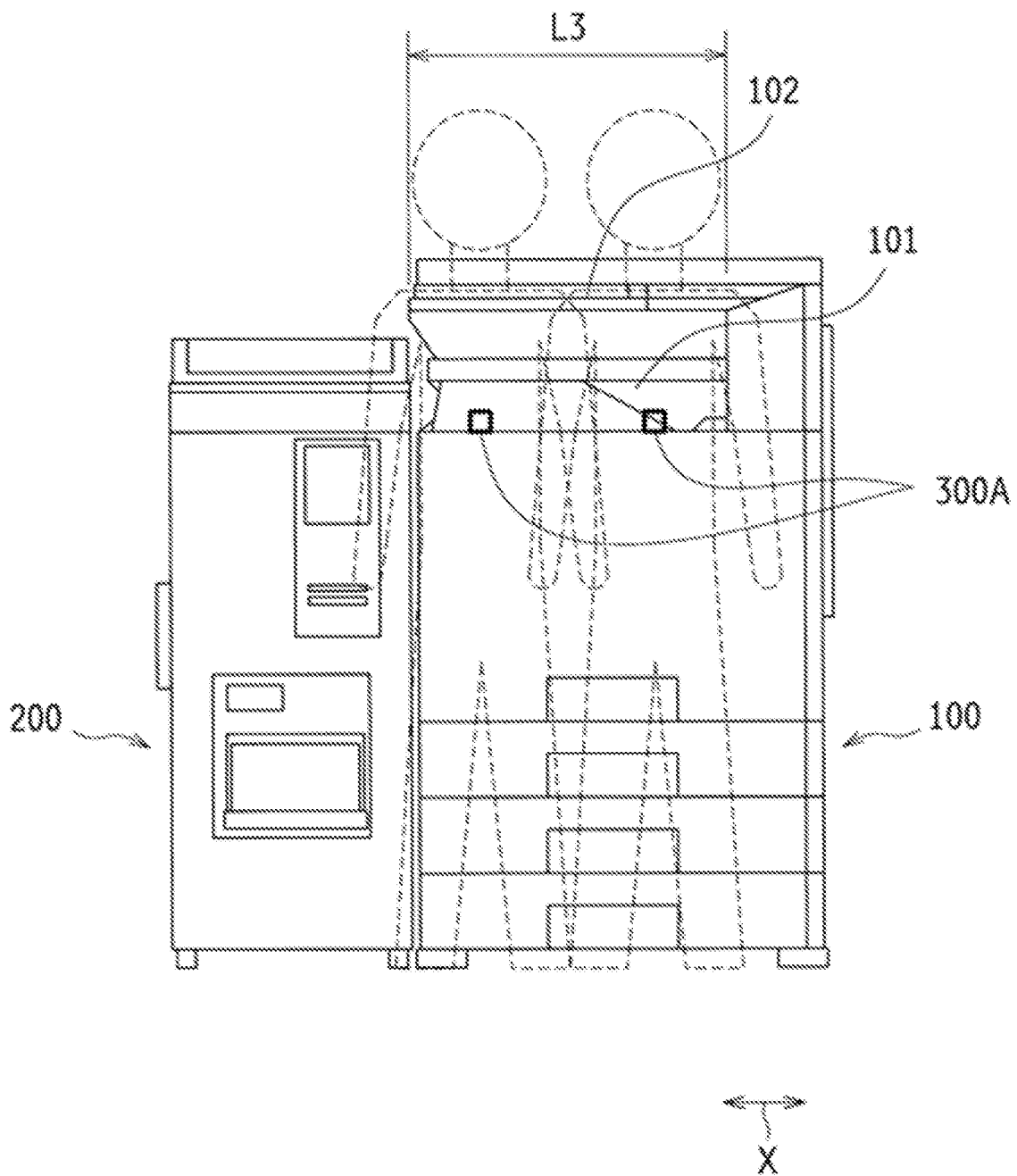
FIG. 4 is a front view illustrating installation positions of the detection sensors in the image forming apparatus system according to a second embodiment of the present invention.
Figure 5:
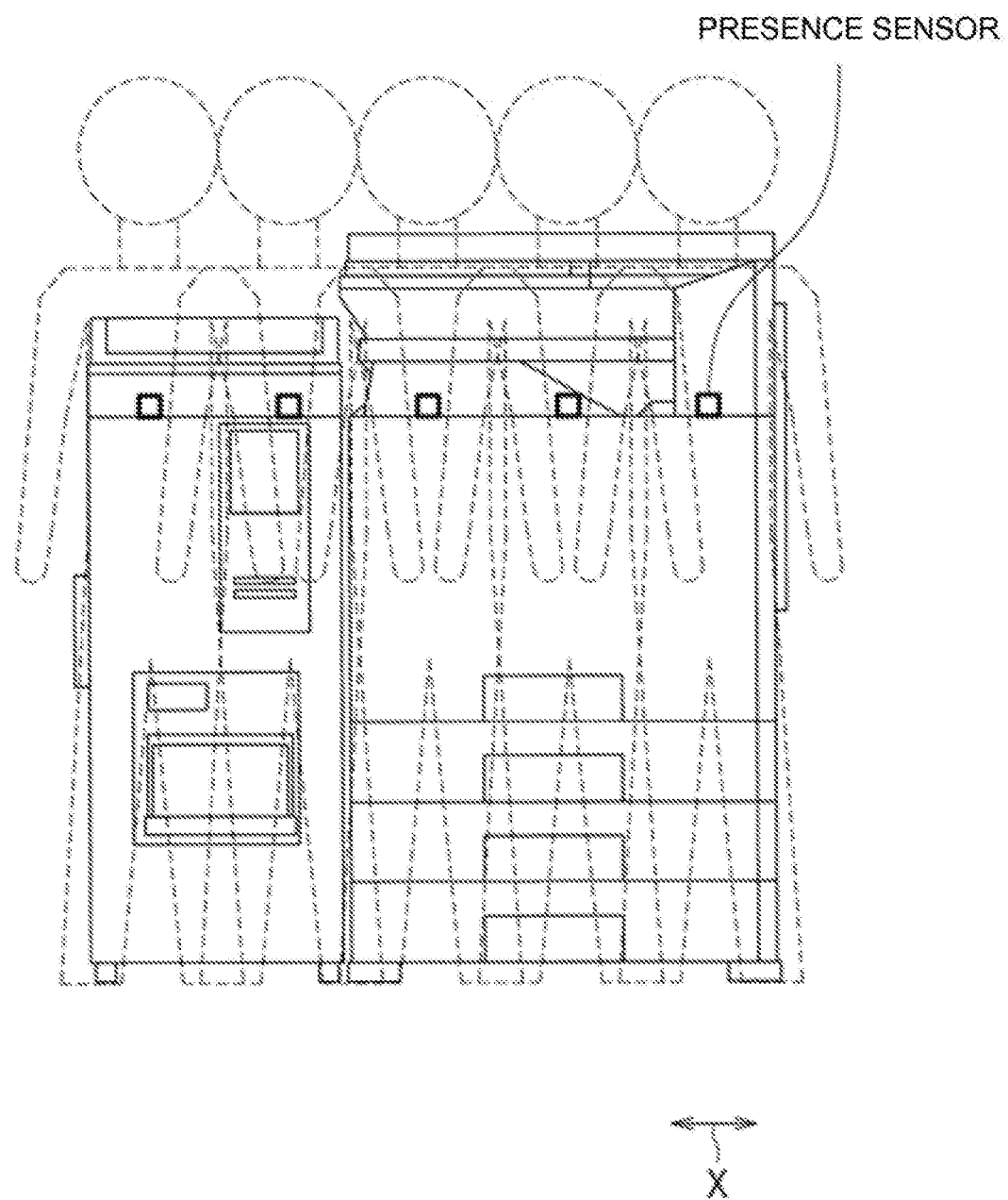
FIG. 5 is a front view illustrating installation positions of detection sensors in a conventional image forming apparatus system.

FIG. 4 is a front view illustrating the installation positions of the first detection sensors 300A in the image forming apparatus system 10 according to the second embodiment of the present invention. In the image forming apparatus system 10 illustrated in FIG. 4, it is assumed that the range of the normal operation of the image forming apparatus 100 is an area L3 of the sheet discharger 101 in the horizontal direction X. Therefore, the first detection sensors 300A are disposed within the range of the area L3 of the sheet discharger 101 in the horizontal direction X. In this case, the number of the first detection sensors 300A installed is not limited to one, but a plurality (two in the example of FIG. 4) of the first detection sensors 300A may be disposed within the range of the area L3.

The user of the image forming apparatus 100 does not always perform an operation through the operator 102 and may take out the recording sheet discharged to the sheet discharger 101. Therefore, depending on the positional relationship between the operator 102 and the sheet discharger 101, it may be possible to execute the auto-clear properly if the area L3 of the sheet discharger 101 is assumed to be the range of the normal operation.

Although the second detection sensor 300B in the coin device 200 is not illustrated in the image forming apparatus system 10 in FIG. 4, the second detection sensor 300B may be provided in the coin device 200 as is the case with the first embodiment.

Third Embodiment

In the description according to the above-described first and second embodiments, the auto-clear is executed after the detection sensor 300 (basically, the first detection sensor 300A) detects that the user has left and then a predetermined auto-clear time has elapsed. With regard to the auto-clear, the image forming apparatus 100 according to a third embodiment of the present invention may change the auto-clear time in accordance with the details of the final operation when it is detected that the user has left.

In the image forming apparatus 100 according to the third embodiment, when the controller 150 receives the signal indicating the absence of the user from the detection sensor 300 halfway through a series of operations having a plurality of steps, the controller 150 determines whether the user's operation has completed or is in progress at that time.

The "complete state of the user's operation" described here refers to the state where, although all the user's input operations have been completed during a series of operations for a copy process, a fax process, a print process, etc. and the process of the image forming apparatus 100 has been completed, the guidance is continuously displayed on the operator 102 and the portal screen is not set. Therefore, the "complete state of the user's operation" is regarded as being halfway during the series of operations due to the continuous display of the guidance on the operator 102.

According to the third embodiment, when the detection sensor 300 detects that the user has left (when the detection sensor 300 does not detect the detection of the user) and the user's operation has been completed at the corresponding time, the auto-clear time is set to a short time (a first auto-clear time: for example 10 seconds). This allows the next user to promptly use the image forming apparatus 100.

Conversely, when the detection sensor 300 detects that the user has left and the user's operation is halfway at the corresponding time, the auto-clear time is set to a long time (a second auto-clear time (>the first auto-clear time): for example approximately 30 seconds to 60 seconds). This is because, when the user has left in the middle of the operation, for example, it may be considered that the user has gone to ask a store clerk how to use and it is not necessarily the case that the user has left the operation unattended. For this reason, it is preferable that, when the user has left in the middle of the operation, a short auto-clear time is not set so that the user may come back and resume the operation.

The embodiments disclosed herein are illustrative in all respects and do not provide a basis for limited interpretation. Therefore, the technical scope of the present invention is not interpreted only by using the above-described embodiments but is defined based on the description in the scope of claims. Furthermore, the meanings equivalent to those in the scope of claims and all modifications within the scope are included.

What is claimed is:

1. An image forming apparatus system comprising:
an image forming apparatus; and
a payment device disposed adjacent to the image forming apparatus to receive a usage fee to use the image forming apparatus, wherein
the image forming apparatus includes a detection sensor that detects a user,
the image forming apparatus executes auto-clear after a predetermined auto-clear time has elapsed when detection of the user is not detected by the detection sensor partially through a series of operations of the image forming apparatus,
the image forming apparatus includes, as the detection sensor, only a first detection sensor disposed within a range of an area of an operator in the image forming apparatus,
the payment device includes a second detection sensor that detects the user, disposed within a range of an area of the payment device, and
the image forming apparatus executes auto-clear after the predetermined auto-clear time has elapsed when both the first detection sensor and the second detection sensor do not detect detection of the user.

2. The image forming apparatus system according to claim 1, wherein the first detection sensor is a single-function detection sensor capable of detecting only detection of a user in accordance with a temperature characteristic or an action within a detection range of the first detection sensor.

3. The image forming apparatus system according to claim 1, wherein
a first auto-clear time is set as a time before the auto-clear when the first detection sensor does not detect the detection of the user and the user's operation has been completed at a corresponding time, and
a second auto-clear time that is longer than the first auto-clear time is set as the time before the auto-clear when the first detection sensor does not detect the detection of the user and the user's operation is partially complete at a corresponding time.

4. An image forming apparatus system comprising:
an image for apparatus; and
a payment device disposed adjacent to the image forming apparatus to receive a usage fee to use the image forming apparatus, wherein
the image forming apparatus includes a detection sensor that detects a user,
the image forming apparatus executes auto-clear after a predetermined auto-clear time has elapsed when detection of the user is not detected by the detection sensor partially through a series of operations of the image forming apparatus,
the image forming apparatus includes, as the detection sensor, only a first detection sensor disposed within a range of an area of a sheet discharger in the image forming apparatus,
the payment device includes a second detection sensor that detects the user, dispose within a range of an area of the payment device, and
the image forming apparatus executes auto-clear after the predetermined auto-clear time has elapsed when both the first detection sensor and the second detection sensor do not detect detection of the user.

5. The image forming apparatus system according to claim 4, wherein the first detection sensor is a single-function detection sensor capable of detecting only detection of a user in accordance with a temperature characteristic or an action within a detection range of the first detection sensor.

6. The image forming apparatus system according to claim 4, wherein
a first auto-clear time is set as a time before the auto-clear when the first detection sensor does not detect the detection of the user and the user's operation has been completed at a corresponding time, and
a second auto-clear time that is longer than the first auto-clear time is set as the time before the auto-clear when the first detection sensor does not detect the detection of the user and the user's operation is partially complete at a corresponding time.

* * * * *